(12) United States Patent  
DeCusatis et al.

(10) Patent No.: US 9,515,931 B2
(45) Date of Patent: Dec. 6, 2016

(54) VIRTUAL NETWORK DATA CONTROL WITH NETWORK INTERFACE CARD

(71) Applicant: International Business Machines Corporation, Armonk, NY (US)

(72) Inventors: Casimer M. DeCusatis, Poughkeepsie, NY (US); Keshav G. Kamble, Fremont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 14/291,915

(22) Filed: May 30, 2014

(65) Prior Publication Data

US 2015/0350081 A1 Dec. 3, 2015

(51) Int. Cl.
*H04L 12/801* (2013.01)
*H04L 12/46* (2006.01)

(52) U.S. Cl.
CPC ........... *H04L 47/12* (2013.01); *H04L 12/4633* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 2006/0233175 A1* | 10/2006 | Ge | H04L 45/04 370/392 |
| 2008/0137855 A1 | 6/2008 | Enomoto et al. | |
| 2010/0131669 A1 | 5/2010 | Srinivas et al. | |
| 2010/0211947 A1 | 8/2010 | van Riel | |
| 2011/0320632 A1* | 12/2011 | Karino | H04L 45/586 709/238 |
| 2012/0099602 A1* | 4/2012 | Nagapudi | H04L 12/4633 370/401 |
| 2012/0151004 A1 | 6/2012 | Pope | |
| 2012/0324038 A1 | 12/2012 | Chen et al. | |
| 2013/0033993 A1 | 2/2013 | Cardona et al. | |
| 2013/0044629 A1 | 2/2013 | Biswas et al. | |
| 2013/0061047 A1 | 3/2013 | Sridharan et al. | |
| 2013/0124750 A1* | 5/2013 | Anumala | H04L 12/4625 709/232 |
| 2013/0297768 A1 | 11/2013 | Singh | |
| 2013/0311637 A1 | 11/2013 | Kamath et al. | |

(Continued)

OTHER PUBLICATIONS

U.S. Appl. No. 14/291,915, filed May 30, 2014.

(Continued)

*Primary Examiner* — Yemane Mesfin
*Assistant Examiner* — Peter Chen
(74) *Attorney, Agent, or Firm* — Cantor Colburn LLP; Steven Chiu

(57) ABSTRACT

Embodiments relate to managing data flows through a virtual network. An aspect includes receiving, by a network interface card (NIC) connected to a hypervisor of a source computer, flows of data packets from one or more virtual machines managed by the hypervisor. The aspect includes running, by the NIC, an overlay network protocol to encapsulate the data packets, and to manage the flow of data through tunnels for the virtual network to a destination computer based on the overlay protocol, the tunnels transmitting the data packets through an underlying physical network underlying the virtual network.

5 Claims, 5 Drawing Sheets

(56) References Cited

U.S. PATENT DOCUMENTS

| 2014/0086253 A1* | 3/2014 | Yong | H04L 12/4633 |
| | | | 370/395.53 |
| 2014/0185616 A1* | 7/2014 | Bloch | G06F 9/45533 |
| | | | 370/392 |
| 2014/0297785 A1* | 10/2014 | Galles | H04L 69/22 |
| | | | 709/217 |
| 2015/0026681 A1* | 1/2015 | Lin | G06F 9/45533 |
| | | | 718/1 |

OTHER PUBLICATIONS

U.S. Appl. No. 14/501,501, filed Sep. 30, 2014.
List of IBM Patents ot Patent Applications Treated as Related—Date Filed: Nov. 6, 2014; 1 page.
Su et al., "Using Direct Cache Access Combined With Integrated NIC Architecture to Accelerate Network Processing", IEEE 14th International Conference on High Performance Computing and Communications, 2012, pp. 509-515.

\* cited by examiner

VIRTUAL NETWORK DATA CONTROL WITH NETWORK INTERFACE CARD

BACKGROUND

The present invention relates generally to virtual networks, and more specifically, to controlling data flows in virtual network with a network interface card.

Network virtualization creates a virtual network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. Tunnels are implemented by encapsulating packets transmitted by a source end station into an overlay header that transports the packet from the source switch to a target switch via an internet protocol (IP)-based network. In addition to this tunneling mechanism, the edge switches participate in an address discovery protocol, which may be learning/flooding based, or lookup-based.

Overlay networks like Virtual eXtensible Local Area Network (VXLAN) connect geographically separated Layer-2 (L2) networks using tunnels. These are L2 over Layer-3 (L3) tunnels. L2 packets originated by a virtual machine (VM) in a VXLAN and destined to another VM or group of VMs in same VXLAN in another physical location are carried over L3 tunnels. VXLAN tunnels are created by encapsulating data packets with VXLAN identifiers, which identify the tunnel through which the data packets are to flow.

SUMMARY

Embodiments include a system, for controlling data in a virtual network. Embodiments include receiving, by a network interface card (NIC) connected to a hypervisor of a source computer, flows of data packets from one or more virtual machines managed by the hypervisor. Embodiments include running, by the NIC, an overlay network protocol to encapsulate the data packets, and to manage the flow of data through tunnels for the virtual network to a destination computer based on the overlay protocol, said tunnels for transmitting the data packets through an underlying physical network underlying the virtual network.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Conventional virtual network systems use a hypervisor to encapsulate packets with VXLAN headers and pass the packets into a network via a network interface card that does not perform additional flow control of the packet. Embodiments relate to controlling flow of separate tunnels for a virtual network by a network interface card.

Figure 1:
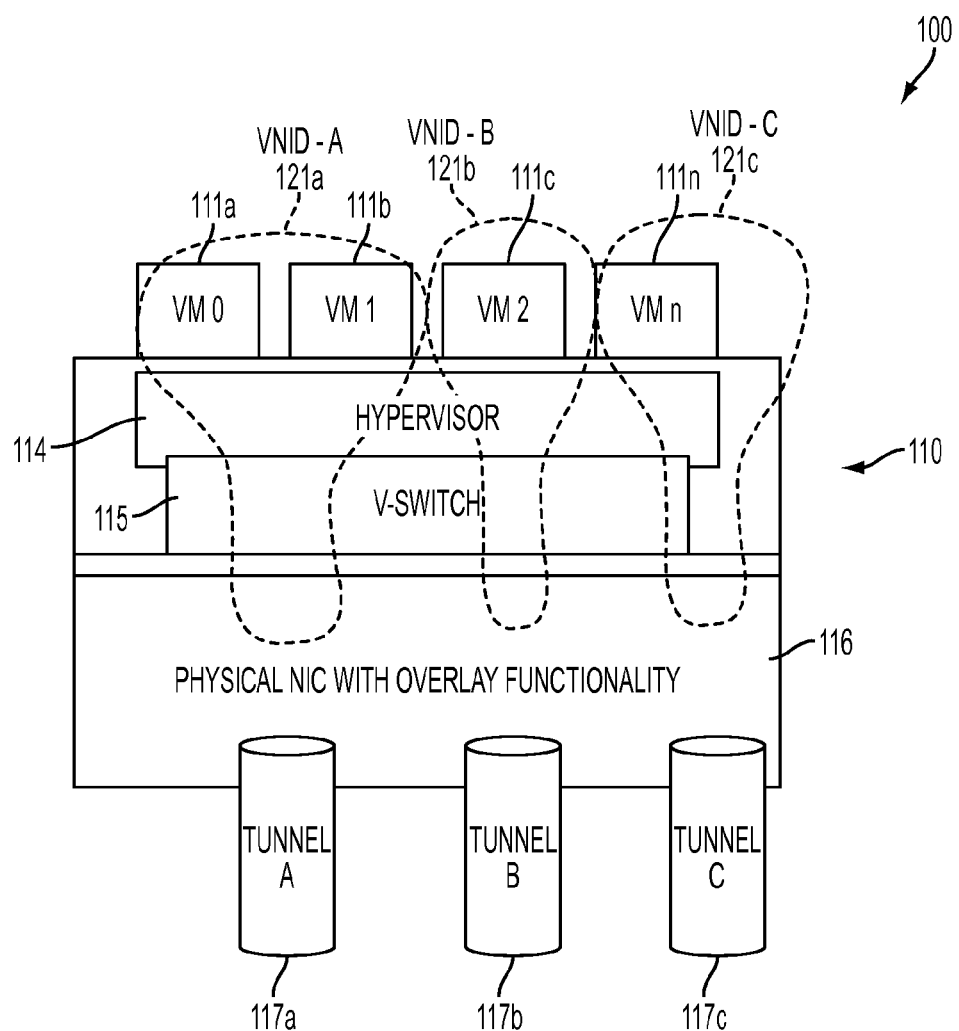
FIG. 1 depicts an overlay network in accordance with an embodiment.

Turning now to FIG. 1, a conceptual view of an overlay network system 100 including overlay networks 121a, 121b, and 121n is shown. The overlay network 121a includes virtual machines 111a and 111b and is associated with a virtual network identifier VNID-A. The overlay network 121b includes virtual machine 111c and is associated with a virtual network identifier VNID-B. The overlay network 121n includes virtual machine 111n and is associated with a virtual network identifier VNID-C. The overlay network 121a uses Virtual Tunnel A 117a for all its data forwarding and receiving between the physical NIC 116 and an immediate overlay gateway. Similarly, the overlay network 121b uses Virtual Tunnel B 117b for all its data forwarding and receiving between the physical NIC 116 and the immediate overlay gateway, and the overlay network 121n uses Virtual Tunnel C 117c for all its data forwarding and receiving between the physical NIC 116 and the immediate overlay gateway.

The network infrastructure functionality is typically associated with and/or used in a network infrastructure, including switches, connectors, wires, circuits, cables, servers, hosts, storage media, operating systems, applications, ports, I/O devices, etc.

Components of the virtual switch 115 typically identify where to forward packets based on a virtual network identifier, referred to as a VNI or VNID. This is typically a 24-bit code or number and destination MAC address along with other parameters. The virtual switch 115 has the capability of tunneling layer-2 packets over the layer-3 network by encapsulating the layer-2 packets into an overlay header. This may be performed using Virtual eXtensible Local Area Network (VXLAN) or some other overlay capable protocol, such as locator/ID separation protocol (LISP), overlay transport virtualization (OTV), NVGRE, etc. The packet may also be encapsulated in a user datagram protocol (UDP) and internet protocol (IP) UDP/IP header. The virtual switch 115 may include one or more point-to-point tunnels (such as tunnels 117a to 117c), and/or point-to-multi-point tunnels. In addition, any of these tunnels may be created, removed, altered and modified based on any number of factors, such as new devices being added to the overlay network system 100, removal of devices from the overlay network system 100, and startup of any end devices, such as devices managing tunnel end points, virtual overlay network gateways, hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device. In one embodiment, the mapping of the original packet's source address, destination address, and the tunnel identifier is performed by the NIC 116. In this method, all the VTEPs (Virtual Tunnel End Points) are completely managed by the special logic in NIC hardware. This logic takes care of mapping packets to tunnels, encap-decap of packets for/from the tunnels, multicast functionality, packets queuing and de-queuing, etc.

In some embodiments, the virtual switch 115 controls the flow of packet data corresponding to virtual tunnels with the NIC 116. In particular, in some embodiments, the NIC 116 receives data flows, or in other words flows of data packets, from the virtual switch 115 of the hypervisor 114. The data flows may be generated by the virtual machines 111a to 111n. The NIC 116 runs a virtual extensible local area network (VXLAN) protocol to encapsulate the data packets and to manage the flow of the data through tunnels 117a to 117c to a destination computer, such as a gateway, based on the VXLAN protocol.

In one embodiment, the NIC 116 creates the tunnels for the virtual networks 121a to 121c by assigning VXLAN identifiers (IDs) and adding new tunnel headers to the data flows according to desired destinations of the data flows, priority levels of the data flows, utilization of the data flows, or any other desired criteria for assigning data flows to tunnels.

In one embodiment, the NIC 116 manages the flow of data through the tunnels by identifying virtual identifiers in the data packets and applying VXLAN IDs to route the data packets according to the desired destinations of the data packets.

In one embodiment, the NIC 116 routes multiple different data flows into each tunnel 117a to 117c. In addition, the NIC 116 may apply data flow strategies to determine how to route the multiple different data flows. For example, in one embodiment, applying the data flow strategy includes assigning a higher priority to a first tunnel and a lower priority to a second tunnel, and reducing a flow of data packets through the first tunnel less than through the second tunnel based on detecting congestion at one of the virtual network and the destination computer. However, embodiments encompass any data flow strategy by the NIC 116 to control the flow of data through tunnels 117a to 117c. This flow control includes flow control of data flows per tunnel between the NIC 116 and an overlay gateway switch (not shown in FIG. 1).

In one embodiment, the NIC 116 manages the flow of data through the tunnels 117a to 117c by identifying the data packets designated to flow through each tunnel, respectively, and managing the flow of data through each tunnel separately from each other tunnel.

In some embodiments, the NIC 116 does not merely pass through data packets from the hypervisors 114 and 121, but rather the NIC 116 analyzes the non-VXLAN encapsulated packets, and encapsulates the packets with header data including a VXLAN ID corresponding to a tunnel to direct the data to the tunnel through the virtual network.

Figure 2:
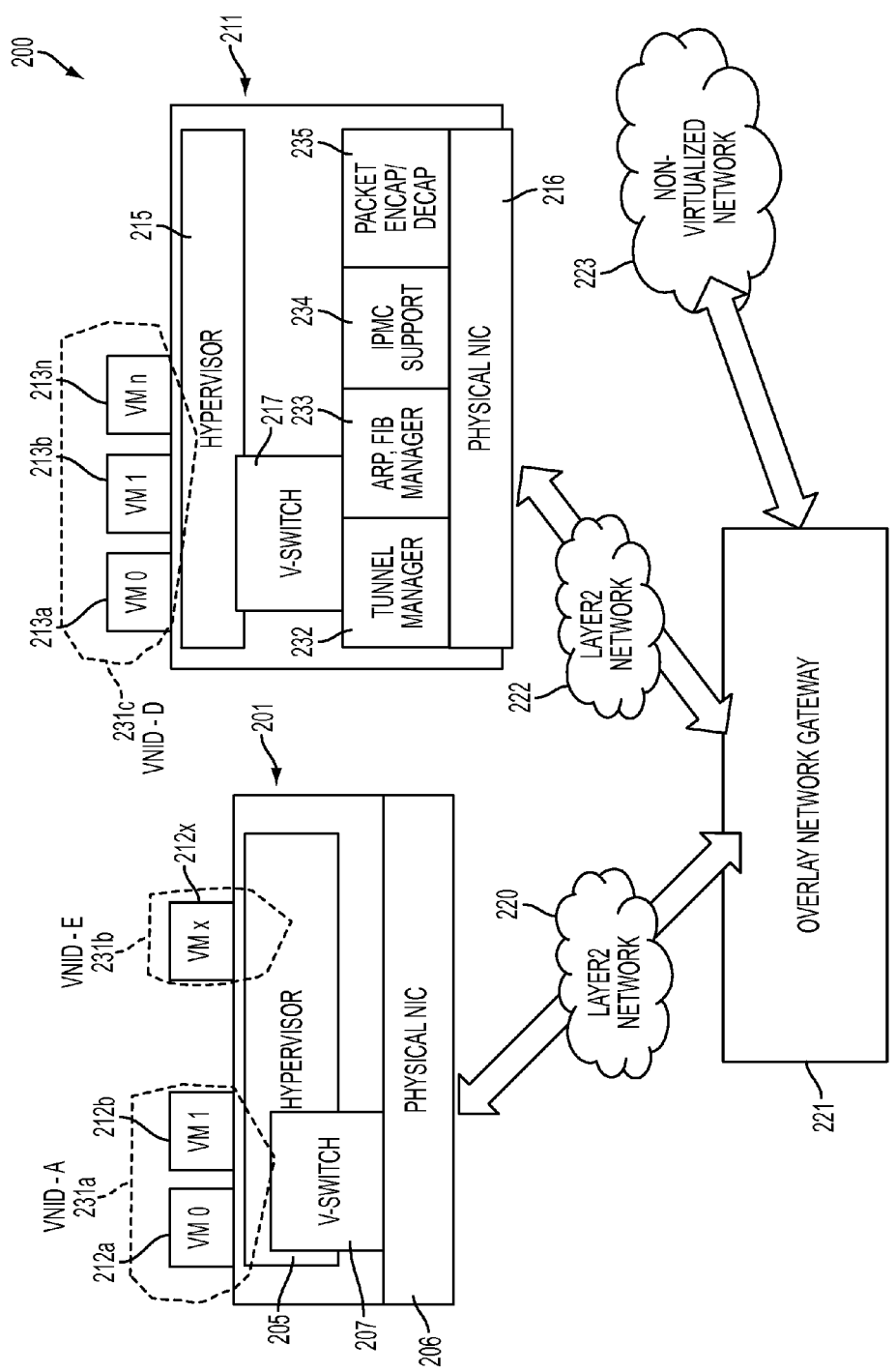
FIG. 2 depicts a virtual network system in accordance with an embodiment.

FIG. 2 illustrates a system 200 according to one embodiment. The system 200 includes one or more networks 201 and 211 including virtual machines 212a, 212b, and 212x connected to a hypervisor 205 and virtual machines 213a, 213b, and 213n connected to the hypervisor 215. The hypervisors 205 and 215 may be connected to network interface cards 206 and 216 to facilitate communication between the hypervisors 205 and 215 and the layer 2 (L2) networks 220 and 222, such as by adding header content to the packet flow. The hypervisors 205 and 215 are capable of tunneling through the virtual network 220, or through an underlying physical network that underlies the virtual network, to each other. In embodiments of the invention, virtual machines are grouped into virtual networks based on virtual network identifiers (VNIDs). For example, FIG. 2 illustrates virtual machines 212a and 212b as part of a first virtual network 231a corresponding to VNID-A; virtual machine 212x being part of a second virtual network 231b corresponding to VNID-E; and virtual machines 213a to 213n as part of a third virtual network 231c corresponding to VNID-D.

Each hypervisor 205 and 215 may be connected to any number of virtual machines. In addition, network interface cards 206 and 216 may be located downstream of the hypervisors 205 and 215, between the hypervisors 205 and 215 and the L2 networks 220 and 222. In one embodiment, the NICs 206 and 216 include virtual extensible local area network (VXLAN) protocol applications, or the NICs 206 and 216 may execute VXLAN protocols stored in memory, to create tunnels through the L2 networks 220 and 222, or through the underlying physical network.

In one embodiment, the system 200 includes an overlay network gateway 221 to interface between the L2 networks 220 and 222 and the non-virtualized networks 223 and 224. In one embodiment, the L2 networks are connected to endpoints, or destination nodes of the data packets generated by the virtual machines 212a to 212x and 213a to 213n. Examples of endpoints include other virtual machines, computers, servers, and any other computing devices capable of receiving data via a network.

Similar to the overlay network system 100 illustrated in FIG. 1, the NICs 206 and 216 receive data flows from the hypervisors 205 and 215, encapsulate the data packets of the data flows with VXLAN headers to create tunnels, and apply a flow control algorithm or policy to determine how the data flows are transmitted through the tunnels. For example, in one embodiment, the NICs 206 and 216 control the flow of the data packets by determining whether to direct multiple different data flows through the same tunnels, direct separate data packet flows through separate tunnels, or direct one data packet flow through multiple tunnels. Likewise, the V-switches 207 and 217 of FIG. 2 may correspond to the V-switch 115 of FIG. 1.

Figure 3:
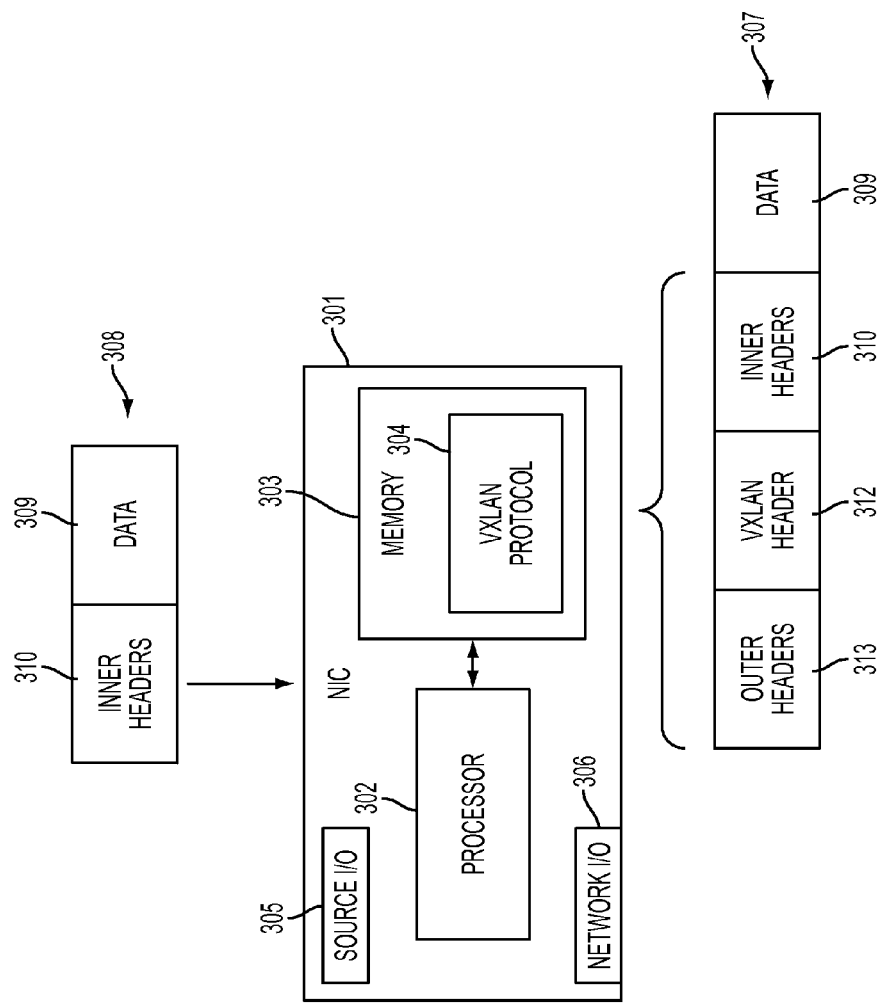
FIG. 3 depicts a network interface card and data packet according to one embodiment.

FIG. 3 illustrates an example of a network interface card 301 and data packet 307 according to an embodiment. The NIC 301 includes a processor 302 and memory 303. The memory 303 has stored therein a VXLAN protocol 304. The NIC 301 also includes a source computer input/output (I/O) module 305 having physical connections to physically connect to communications circuitry in the source computer, and a network I/O module 306 having physical connections to physically connect to communications circuitry of a network. For example, in one embodiment, the source computer I/O module 305 includes serial or parallel slot connectors, and the network I/O module 306 includes wire connectors, such as Ethernet wire connectors, for connecting to an Ethernet wire.

In some embodiments, NIC 301 has memory 304 which can hold data frames sent by a virtual switch. These frames do not carry overlay headers. The NIC processor 302 adds the overlay headers according to the destination of the frame. The memory also queues frames received from the network side. These frames have overlay headers. The processor removes the overlay headers (tunnel headers) from these frames and delivers them to the virtual switch. The virtual switch in turn, delivers it to the correct target virtual machine. In FIG. 3, the frame 308 represents a frame stored in memory 304 without overlay headers. The frame 308 includes data 309 and inner headers 310, such as L2 headers to direct the flow of the data 309 through L2 circuitry. The NIC 301 adds a VXLAN header 312 and outer headers 313 to the frame 308 to generate a data packet 307. The VXLAN header 312 and outer headers 313 are added according to the destination of the data packet 307.

In embodiments of the invention, hardware, including logic circuitry, in the physical NICs 206 and 216 includes tunnel manager logic 232 to manage mapping packets to tunnels, address resolution protocol (ARP) and forwarding information base (FIB) manager logic 233, multicast support logic 234, packet encap-decap logic 235, and any other logic necessary to generate tunnels and direct data packets through tunnels in a hardware layer underlying the L2 networks 220 and 222.

Figure 4:
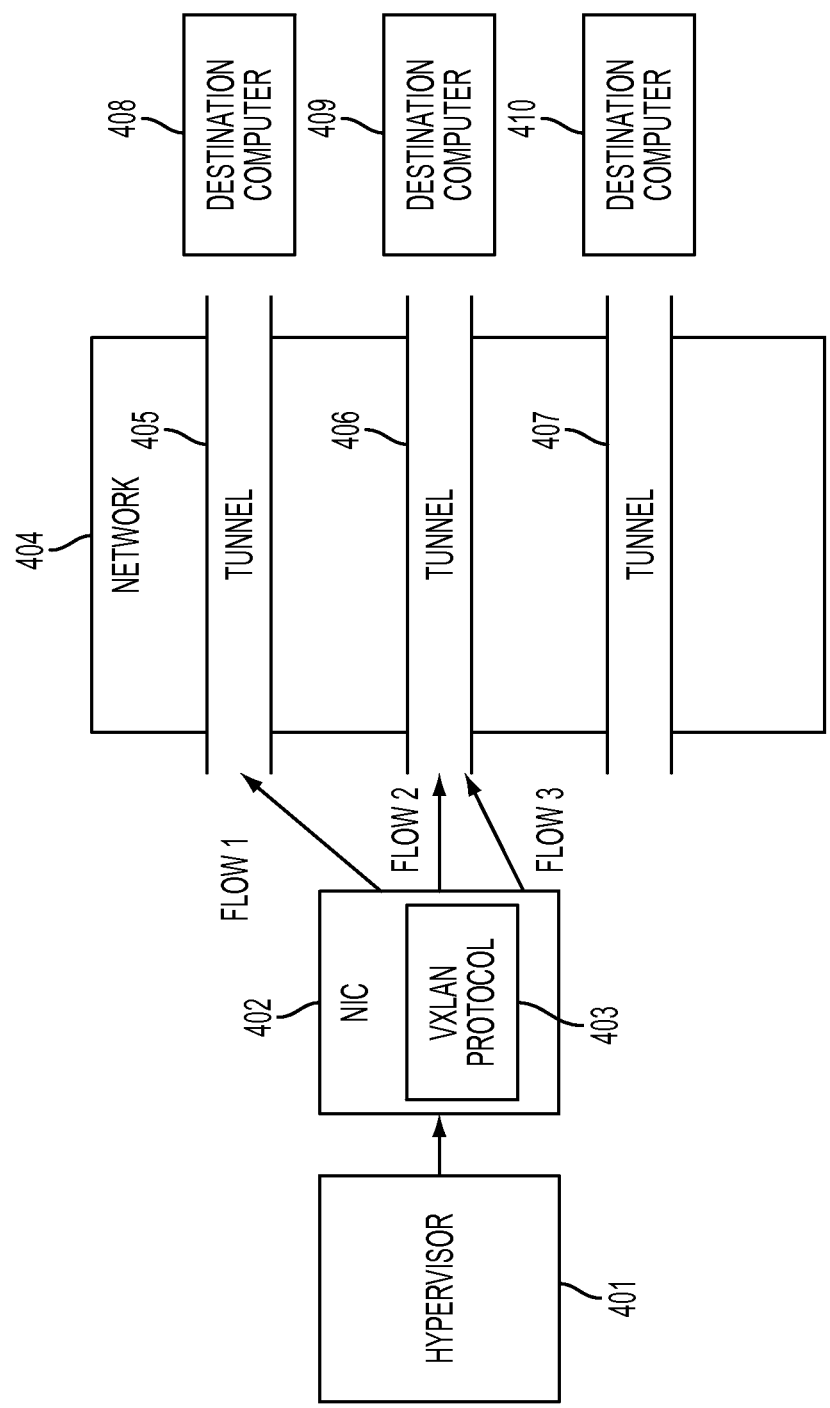
FIG. 4 depicts a flow control process of a network interface card according to an embodiment.

FIG. 4 illustrates a flow control operation of a network interface card 402 according to an embodiment. The NIC 402 receives as an input a data packet from a hypervisor 401. The NIC 402 then encapsulates the data packet with a VXLAN header according to a VXLAN protocol 403 stored in the NIC 402. The NIC 402 may generate one or more tunnels 405, 406, and 407 through a underlay network 404 to one or more destination computers or gateways 408, 409, and 410. The destination computers 408, 409, and 410 may be the same destination computer, or may be separate destinations in separate computers.

The NIC 402 controls the flow of data packets into the tunnels 405, 406, and 407 according to any desired criteria, including congestion in one or more of the tunnels 405, 406, or 407 (or, in other words, in the network hardware including switches, routers, memory, etc., that transmits the data packets through the network 404). The NIC can deploy any of the existing standard flow control protocols per tunnel or new approach to flow controlling per tunnel. In embodiments, the NIC 402 controls the data packet flows to direct any number of flows through any number of tunnels, including one flow through one tunnel, multiple flows through one tunnel, dividing a single flow of data through separate tunnels, or directing no flows through a tunnel. In one embodiment, the NIC 402 analyzes conditions in the network 404, at the hypervisor 401 or in the destination computers 408, 409, and 410, and encapsulates data packets from the hypervisor 401 with VXLAN headers corresponding to a desired tunnel based on the analysis of the conditions. For example, the NIC 402 may manage data packet flow based on congestion levels, traffic levels, reliability levels, processing speeds of hardware, or any other criteria that may affect data traffic flow, this can also be referred to as load balancing across tunnels to the destination based upon the congestion information per tunnel.

Figure 5:
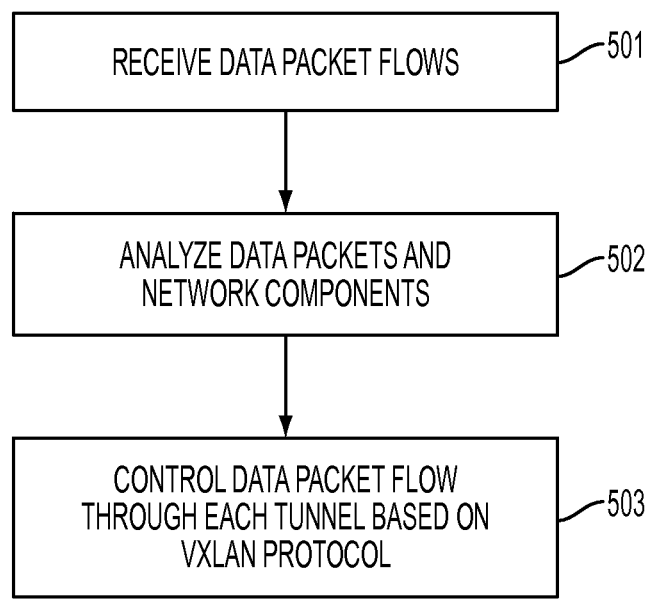
FIG. 5 is a flow diagram of a method for controlling data packet flow through a virtual network according to an embodiment.

FIG. 5 is a flow diagram of a method according to an embodiment. In block 501, data packet flows are received by a network interface card. In particular, virtual machines generate data packets which are routed through a hypervisor virtual switch to the NIC. In block 502, the NIC analyzes the data packets and network components. For example, the NIC may identify data packets having predetermined characteristics, such as priority levels, data content, header content, destination data, or any other predetermined data that may be of interest to a user or system in directing the flow of the data packet. The analysis of network components may be real-time analysis, such as determining congestion levels in certain tunnels, at certain destination computers, or in any other component, determining processing speeds of certain components, determining storage levels in memory components, or determining any other varying characteristic. Alternatively, the analysis of network components may include analyzing static network data, such as total memory capacity of a memory device, total bandwidth capability of one or more components (as opposed to an analysis of the actual available bandwidth based on data usage of the components), reliability of components, etc.

In block 503, the NIC generates tunnels through a virtual network, or assigns data to existing tunnels, based on the analysis of the data packets and one or more components of the virtual network. For example, the NIC may assign multiple flows to a single tunnel having a greater bandwidth or higher data transmission priority than other tunnels. Similarly, the NIC may assign data packets having a higher priority to a tunnel having a higher priority, less congestion, a faster transmission speed, higher reliability, or any other desired characteristic. In embodiments, the NIC creates tunnels or assigns data packets to tunnels by encapsulating the data packets with a VXLAN header according to a VXLAN protocol.

Technical effects and benefits include accelerating data transmission through a network by using the NIC as a hardware accelerator to encapsulate data packets with VXLAN headers to direct the data packets through desired tunnels according to criteria analyzed by the NIC.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to some embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for controlling a flow of data packets in a virtual network, the system comprising:
    a source computer including a hypervisor for managing one or more virtual machines and including a network interface card (NIC), the system configured to perform a method comprising:
    receiving, by the NIC, flows of data packets from the one or more virtual machines managed by the hypervisor; and
    encapsulating the data packets, by the NIC, based on an overlay network protocol, and managing the flow of data packets through tunnels through an underlying physical network underlying the virtual network to a destination computer based on the overlay network protocol,
    wherein managing the flow of data packets through the tunnels comprises applying, by the NIC, a data flow strategy to the tunnels in the underlying physical network by assigning a higher priority to a first tunnel and a lower priority to a second tunnel, and reducing a transmission rate of the flow of data packets through the first tunnel less than through the second tunnel based on detecting congestion in the underlying physical network or between one of the tunnels and the destination computer.

2. The computer system of claim 1, wherein the method further comprises:
    creating, by the NIC, the tunnels through the underlying physical network from the source computer to the destination computer.

3. The computer system of claim 1, wherein managing the flow of data packets through the tunnels comprises:
    identifying, by the NIC, a virtual extensible local area network (VXLAN) identifier (ID) of the data packets; and
    routing the data packets through the underlying physical network based on the VXLAN ID of the data packets.

4. The computer system of claim 1, wherein managing the flow of data packets through the tunnels comprises directing multiple different flows of data packets through a same tunnel.

5. A computer system for controlling a flow of data packets in a virtual network, the system comprising:
    a source computer including a hypervisor for managing one or more virtual machines and including a network interface card (NIC),the system configured to perform a method comprising:
    receiving, by the NIC, flows of data packets from the one or more virtual machines managed by the hypervisor; and encapsulating the data packets, by the NIC, based on an overlay network protocol and managing the flow of data packets through tunnels through an underlying physical network underlying the virtual network to a destination computer based on the overlay network protocol, wherein managing the flow of data packets through the tunnels comprises assigning a higher priority to a first tunnel and a lower priority to a second tunnel, and setting a transmission rate of the flow of data packets through the first tunnel to less than through the second tunnel based on detecting congestion in the first tunnel.

\* \* \* \* \*